United States Patent
Lee et al.

(10) Patent No.: US 9,649,991 B2
(45) Date of Patent: May 16, 2017

(54) STRUCTURE FOR MOUNTING REAR CAMERA FOR VEHICLE

(71) Applicants: Hyundai Motor Company, Seoul (KR); Kia Motors Corporation, Seoul (KR)

(72) Inventors: Yong-Hun Lee, Whasung-Si (KR); Soo-Kyoung Yang, Whasung-Si (KR); Yong Lee, Whasung-Si (KR); Sang-Sul Lee, Whasung-Si (KR); Tae-Yub Kim, Whasung-Si (KR); Ju-Yong Park, Whasung-Si (KR); Yun-Seok Oh, Whasung-Si (KR); Yong-Woo Lee, Whasung-Si (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 0 days.

(21) Appl. No.: 14/951,264

(22) Filed: Nov. 24, 2015

(65) Prior Publication Data
US 2017/0088062 A1 Mar. 30, 2017

(30) Foreign Application Priority Data
Sep. 24, 2015 (KR) .......................... 10-2015-0135671

(51) Int. Cl.
*B60R 11/04* (2006.01)
*G03B 17/56* (2006.01)
*B60R 11/00* (2006.01)

(52) U.S. Cl.
CPC ............ *B60R 11/04* (2013.01); *G03B 17/561* (2013.01); *B60R 2011/004* (2013.01); *B60R 2011/0052* (2013.01); *B60R 2011/0059* (2013.01); *B60R 2011/0063* (2013.01)

(58) Field of Classification Search
USPC ........................................................ 396/419
See application file for complete search history.

(56) References Cited

U.S. PATENT DOCUMENTS

| 2002/0113415 A1 | 8/2002 | Pochmuller |
| 2006/0250500 A1 | 11/2006 | Gloger |
| 2015/0085122 A1 | 3/2015 | Van Den Brink |

FOREIGN PATENT DOCUMENTS

| DE | 102 51 661 A1 | 5/2004 |
| EP | 2 353 940 B1 | 7/2013 |
| JP | 4161225 B2 | 8/2008 |
| JP | 2009-166648 A | 7/2009 |
| KR | 10-2015-0060568 A | 3/2015 |
| WO | WO 2006/097651 A1 | 9/2006 |

*Primary Examiner* — Clayton E Laballe
*Assistant Examiner* — Linda B Smith
(74) *Attorney, Agent, or Firm* — Morgan Lewis & Bockius LLP (57) ABSTRACT

A structure for mounting a rear camera for a vehicle, may include a rear glass in which a mounting hole is perforated; a camera housing in which a camera module is embedded; and a wiper pivot which enters the mounting hole from an internal side of the rear glass, and has an end of an external side coupled with a wiper blade, in which the camera housing is mounted so that the wiper pivot passes through the camera housing, and is fixed between the wiper blade and the rear glass, in a manner that the camera housing is coupled so that the wiper pivot passes through an upper portion of the camera housing, and a camera module is located at a lower portion of the camera housing.

15 Claims, 7 Drawing Sheets

STRUCTURE FOR MOUNTING REAR CAMERA FOR VEHICLE

CROSS-REFERENCE TO RELATED APPLICATIONS

The present application claims priority to Korean Patent Application No. 10-2015-0135671, filed on Sep. 24, 2015, the entire contents of which is incorporated herein for all purposes by this reference.

BACKGROUND OF THE INVENTION

Field of the Invention

The present invention relates to a structure for mounting a rear camera for a vehicle, which is capable of providing a real-time image so as to enable a driver to obtain a rear view of a vehicle when the driver reverses or parks the vehicle, and more particularly, to a structure for mounting a rear camera for a vehicle, which is capable of mounting a rear camera on rear glass integrally with a rear wiper so as to mount the rear camera in a vehicle having no garnish without a protruding portion.

Description of Related Art

Drivers of a passenger vehicle and a commercial vehicle may easily recognize a front situation with their eyes, but an angle of view of a person is limited, so that the driver recognizes rear, left, and right situations of the vehicle through the assistance of a side mirror, a room mirror, and the like.

However, installation places of the side mirror and the room mirror are limited, and a view entering the eyes of the driver is limited according to a design of a rear side of the vehicle, so that the driver steers the vehicle while depending on his/her sense when reversing or parking the vehicle, and thus a probability of an accident is increased.

In order to solve the problem, a rear camera enabling the driver to expand a rear view is provided as a safety device and a convenient device for operating the vehicle. The rear camera is mounted to a trunk, a tail gate, a license plate, a bumper, or a fixing bolt of the vehicle, and is electrically connected with a monitor device of a driver's seat and configured to automatically transmit an image of a rear situation of the vehicle to the monitor device according to an operation of the driver or when a shift gear is in an "R" stage.

Various kinds of rear cameras are currently released and developed, and in order to prevent an appearance of the vehicle from being degraded, when the rear camera is mounted, the rear camera is generally installed in a protruding portion of a trunk or a tail gate, that is, a garnish, an emblem, and a fixing bolt (so that the rear camera is inconspicuous).

However, in a case of a vehicle having no protruding portion at a position, at which the rear camera needs to be mounted, the rear camera protrudes from a panel (because a camera lens needs to be disposed to face a lower side of the rear side of the vehicle), thereby degrading a design of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for mounting a rear camera for a vehicle, which is capable of installing a rear camera even in a vehicle, in which it is inappropriate to install the rear camera at a position of a garnish, an emblem, a fixing bolt, and the like, or which does not have a garnish or an emblem, without degrading an appearance of the vehicle.

An exemplary embodiment of the present invention provides a structure for mounting a rear camera for a vehicle, the structure including: a rear glass, in which a mounting hole is perforated; a camera housing in which a camera module is embedded; and a wiper pivot which enters the mounting hole from an internal side of the rear glass, and has an end of an external side coupled with a wiper blade, in which the camera housing is mounted so that the wiper pivot passes through the camera housing, and is fixed between the wiper blade and the rear glass, in such a manner that the camera housing is coupled so that the wiper pivot passes through an upper portion of the camera housing, and a camera module is located at a lower portion of the camera housing.

A lead wire connected with the camera module may be arranged so as to pass through the mounting hole.

A grommet, which is made of an elastic material, may be coupled with the wiper pivot so as to secure water tightness at a point, through which the wiper pivot passes. The grommet may be mounted so that an end of the grommet protrudes while passing through a coupling hole formed in the camera housing, through which the wiper pivot passes, and a stepped portion, which is formed so as to have a larger external diameter than an internal diameter of the coupling hole and covers a part of a surrounding portion of the coupling hole along a circumference of the coupling hole, may be formed in the grommet.

The grommet may be formed with one or more protrusions formed on an internal peripheral surface of an internal hole, through which the wiper pivot passes, along a circumference of the internal hole.

The structure may further include a base plate which is located so as to be in contact with an external surface of the rear glass at a perforation position of the mounting hole, and coupled with the camera housing, in which the base plate includes a bolt portion protruding into an internal side of the rear glass, and a fastening nut may be screw-engaged with the bolt portion at the internal side of the rear glass, so that the base plate is fixed.

A watertight pad made of an elastic material may be mounted between the rear glass and the base plate. A fitting hole, into which the bolt portion is fitted, may be formed in the watertight pad, and a rib, which is elastically pressed when the base plate is seated, protrudes along a circumference of the fitting hole.

Concave-convex portions, which may be engaged with each other, may be formed in the base plate and the camera housing, respectively, so that the base plate and the camera housing are coupled by the engagement of the concave-convex portions, and a double-sided tape may be bonded onto one surface of the base plate, which is in contact with the rear glass (so that the base plate and the camera housing may be temporarily fixed at proper positions before the coupling with a fastening nut).

A screw thread may be formed on an external peripheral surface of the wiper pivot at a portion protruding to an external side of the camera housing, and the screw thread may be screw-engaged with the fastening nut, so that the camera housing may be fixed. The structure may further include a cap which is coupled with the wiper pivot so as to cover the fastening nut at an external side of the fastening nut.

A fixing recess may be formed in an external peripheral surface of the grommet along a circumference of the external peripheral surface, and the fixing recess may be fitted into a border of the mounting hole, so that the grommet may be fixed.

A mounting clip, which is restrictive by an external surface of a vehicle body panel coupled with the rear glass, may be provided on one surface of the camera housing facing the rear glass, or a restrictive protrusion, which enters a recess formed between a vehicle body panel coupled with the rear glass and the rear glass, so that a movement of the restrictive protrusion is restricted, may be formed on one surface of the camera housing facing the rear glass.

In the structure of the present invention having the aforementioned configuration, the rear camera may be mounted around a rotation axis at a lower end of the rear wiper, so that it is possible to improve a design compared to a case where the rear camera is solely mounted at a separate position.

The present invention provides a structure, in which the rear camera of the present invention may be mounted in the mounting hole, through which the wiper pivot is fitted into the rear glass, in such a manner that a size of an internal diameter of the mounting hole may be minimized. Accordingly, it is possible to solve a problem in the related art in that a position of a mounting hole is inevitably moved to an upper side of a rear glass according to an increase in an internal diameter due to a problem of hardness of the rear glass when the rear glass is manufactured (when the position of the mounting hole is moved to the upper side, the mounting of a wiper may be limited, and a mounting position of the wiper may degrade an attractive appearance and functionality of wiping rain).

According to the present invention, the base plate and the bolt portion are screw-engaged and mounted, so that it is easy to assemble and disassemble the base plate and the bolt portion, and the watertight pad is additionally mounted, in such a manner that the rid protrudes form the watertight pad and the protrusions and the step portion are formed in the grommet, thereby securing watertight performance.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4A, FIG. 4B, FIG. 4C and FIG. 4D are enlarged views of constituent elements of the rear camera according to the exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the Field of the Invention to which the present invention pertains may easily carry out the present invention. However, the present invention may be implemented in various different forms, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to general and dictionary meanings and should be interpreted as having meanings and concepts which conform to the technical spirit of the present invention based on a principle that an inventor can appropriately define a concept of a term to describe his/her own invention in the best manner.

Figure 1:
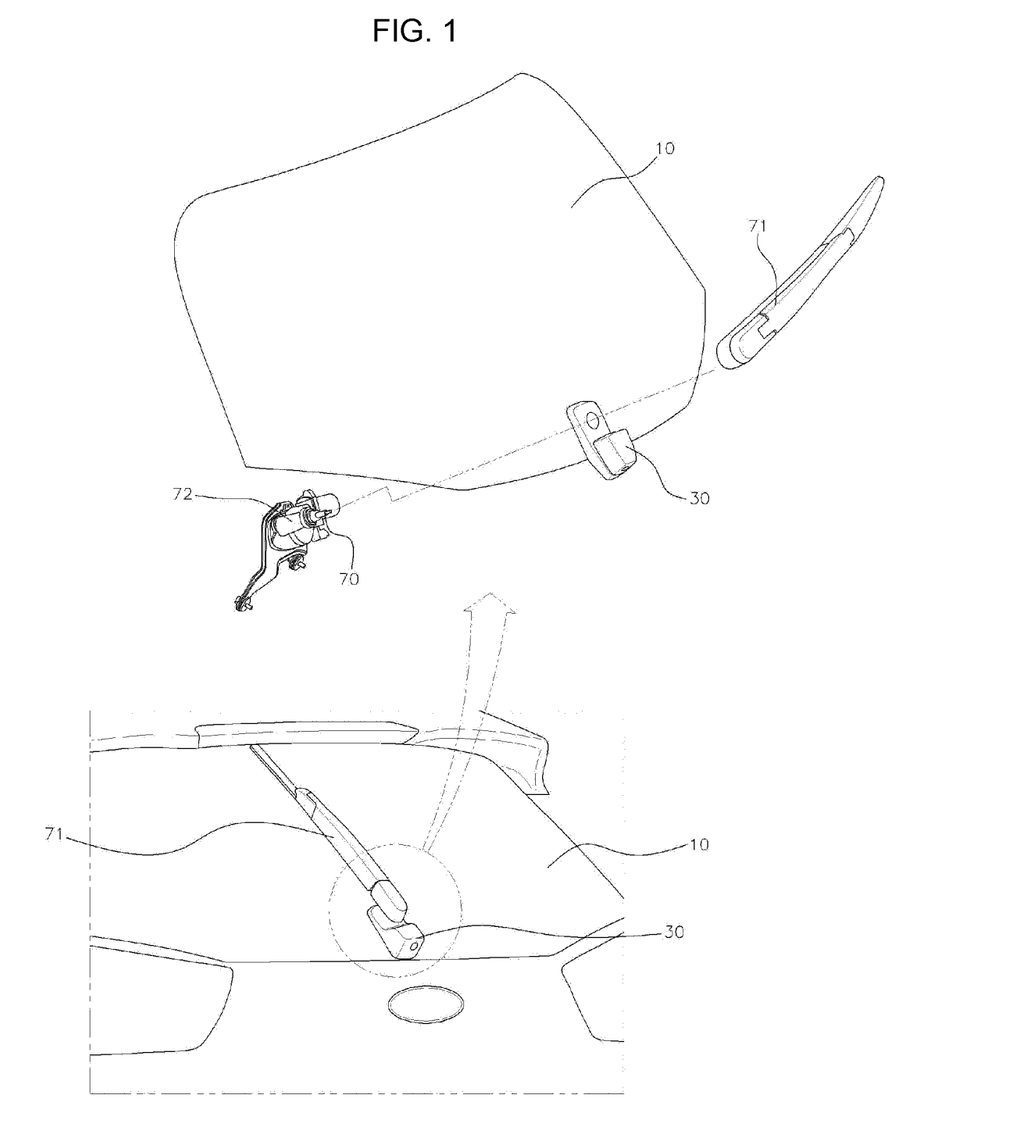
FIG. 1 is a diagram illustrating a state where a rear camera according to an exemplary embodiment of the present invention is mounted and a state before the rear camera is mounted.

The present invention relates to a structure for mounting a rear camera for a vehicle, which is electrically connected to a monitor device of a driver's seat to transmit a rear image of a vehicle to the monitor device in real time according to an operation of a driver or when a gear shift lever is positioned at an "R" stage, and the rear camera of the present invention is not installed in a garnish or an emblem, but is mounted on a rear glass 10 together with a wiper blade 71 as illustrated in FIG. 1.

Referring to the drawings, in an exemplary embodiment of the present invention, a coupling hole 11 (see FIG. 3) is perforated at a center of a lower end of the rear glass 10 so that a wiper pivot 70 coupled with a motor 72 may be coupled with the wiper blade 71 in a state where the wiper pivot 70 coupled with the motor 72 is disposed inside of the rear glass 10 and the wiper blade 71 is disposed outside the rear glass 10 similar to a structure in the related art.

A base plate 20, a camera housing 30, and a watertight pad 80 are coupled with a camera module 80, so that the rear camera of the present invention is mounted between the wiper blade 71 and the rear glass 10.

Figure 2:
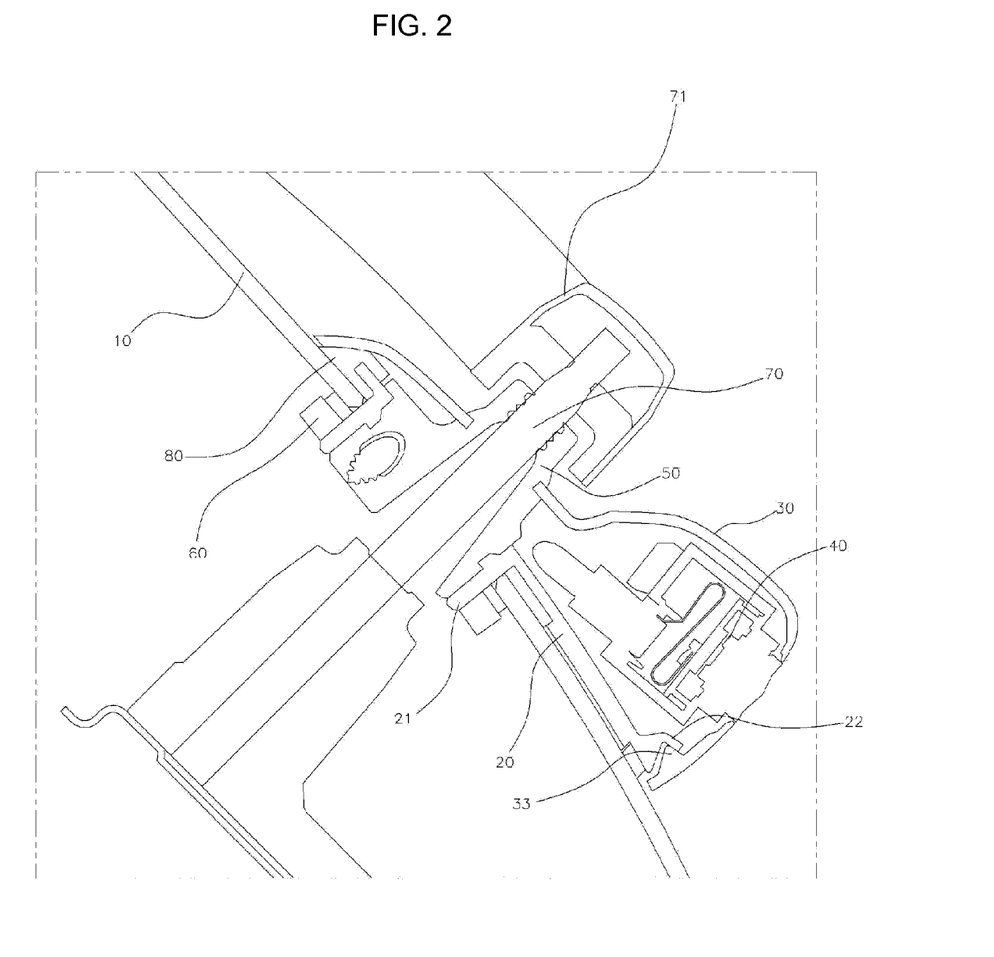
FIG. 2 is a cross-sectional view illustrating a part, on which the rear camera according to the exemplary embodiment of the present invention is mounted.
Figure 3:
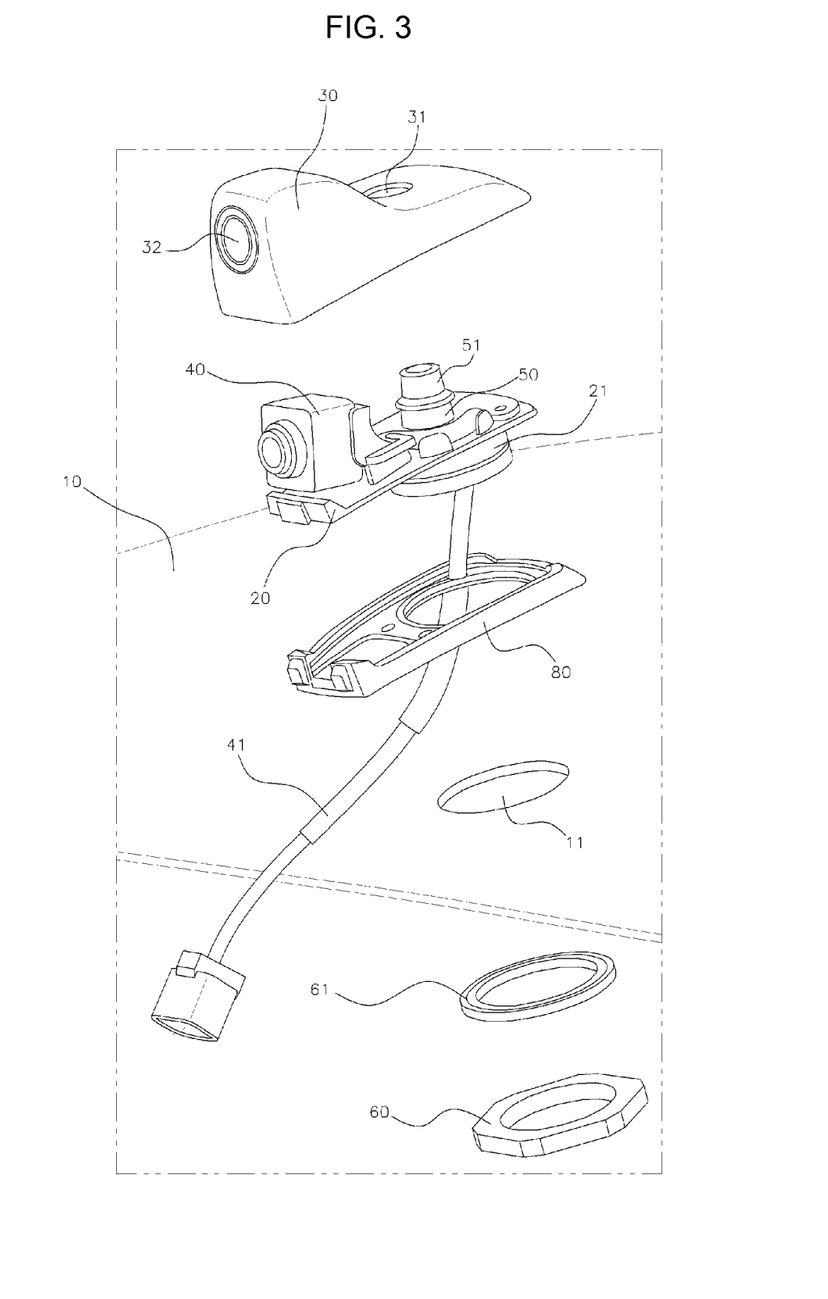
FIG. 3 is a view illustrating a state where the rear camera according to the exemplary embodiment of the present invention is disassembled.

As illustrated in FIGS. 2 and 3, the base plate 20 has a bolt part 21 entering a mounting hole 11 and protruding into the rear glass 10 and is coupled to a lower side (a side contacting the rear glass) of the camera module 40, and the camera housing 30 is formed with a coupling hole 31, through which an upper end 51 of a grommet 50 passes, and a hole 32, through which a lens of the camera module 40 may be exposed, and is mounted to cover the base plate 20 and the camera module 30 at an upper side (a side far from the rear glass) of the camera module 40.

The grommet 50 is coupled with the base plate 20. The grommet 50 is fixedly inserted into a center hole (see a part, into which the grommet is fitted in FIG. 2) formed inside the bolt part 21, and is coupled so that the wiper pivot 70 passes through an internal side of the grommet 50.

The watertight pad 80 made of an elastic material is mounted between the rear glass 10 and the base plate 20 in order to prevent water permeation and prevent the rear glass 10 from being damaged. The watertight pad 80 is formed with a fitting hole 81, into which the bolt part 21 is fitted, as illustrated in FIG. 4C, and a rib 82, which is elastically pressed when the base plate 20 is seated, protrudes along a circumference of the fitting hole 81.

In the aforementioned coupling state, when the bolt part 21 of the base plate 20 is fitted into the rear glass 10 so as to protrude from the internal side of the rear glass 10, a fastening nut 60 and a washer 61 are coupled with the bolt part 21, so that the base plate 20 is mounted.

In the meantime, for convenience of assembling, in a state where the base plate 20, the camera housing 30, and the watertight pad 80 are pre-assembled with the camera module 40, the rear camera of the present invention is fixed by the fastening nut 60 in a state of being temporarily attached at a mounting position in the rear glass 10 with a double-sided tape.

Figure 4A:
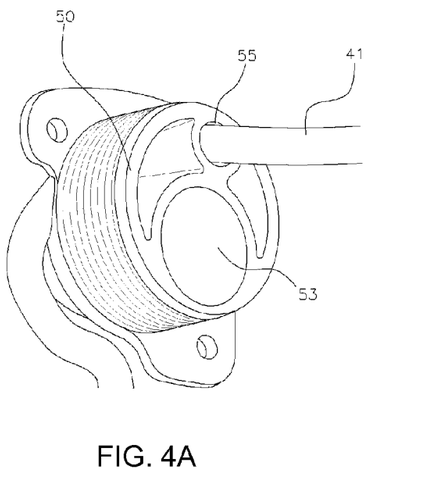
FIG. 4A is a view illustrating a rear side of a grommet (a side contacting a rear glass), into which a lead wire is fitted.

The grommet 50 serves to support a position of the wiper pivot 70, and has a structure, in which an additional hole 55 is perforated so that a lead wire 41 connected to the camera module 40 may be drawn out from the mounting hole 11 as illustrated in FIG. 4A.

Figure 4B:
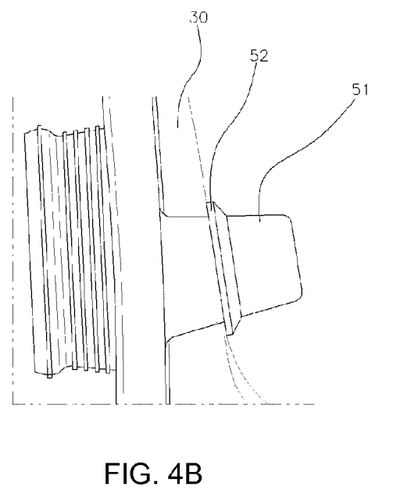
FIG. 4B is a view illustrating a state where a stepped portion is formed at one side of the grommet, FIG. 4C a view illustrating a state where a rib is formed along a circumference of a fitting hole of a watertight pad, and FIG. 4D a view illustrating a state where protrusions are formed on an inner peripheral surface of an internal hole of the grommet.
Figure 4C:
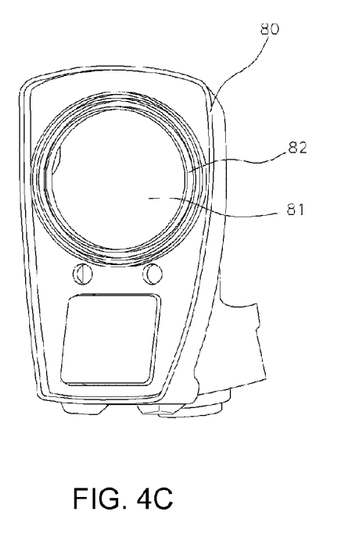
Figure 4D:
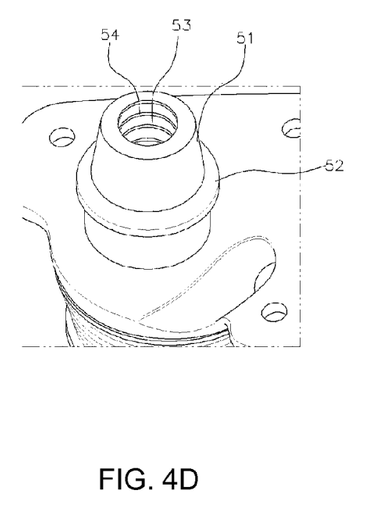

The present invention has a structure for preventing water permeation. First, an end 51 at one side of the grommet 50 is mounted to protrude while passing through the coupling hole 31 formed in the camera housing 30, and a stepped portion 52, which is formed to have a larger external diameter than an internal diameter of the coupling hole 31 and covers a part of a surrounding portion of the coupling hole 31, along a circumference of the coupling hole 31 is formed as illustrated in FIG. 4B. Further, in the grommet 50, one or more protrusions 54 are formed on an internal peripheral surface of an internal hole 53, through which the wiper pivot 70 passes, along a circumference of the internal hole 53. The protrusions 54 are elastically pressed onto an external peripheral surface of the wiper pivot 70 when the wiper pivot 70 is fitted into the grommet 50.

For reference, the grommet 50 may be coupled by fitting coupling between a protrusion and a recess, and concave-convex portions 22 and 33 (see FIG. 2), which may be engaged with each other, are formed in the base plate 20 and the camera housing 30, respectively, so that the base plate 20 and the camera housing 30 may be coupled without using a separate bolt, so that the base plate 20 and the camera housing 30 are coupled by the engagement of the concave-convex portions 22 and 33.

The present invention having the aforementioned configuration has a structure, the watertight pad 80 formed of the elastic material is surface attached to an external side of the rear glass 10, thereby preventing water permeation and preventing the rear glass 10 from being damaged, and the grommet 50 fastened with the wiper pivot 70 and the lead wire 41 is mounted, so that all of the lead wire 41, the wiper pivot 70, and the bolt part 21 of the base plate 20 may be inserted into the mounting hole 11 having a limited size. That is, when an internal diameter of the mounting hole 11 is increased, the mounting hole 11 needs to be moved to an upper side due to a molding issue of the rear glass 10, which, however, may decrease a rear view of the driver and cause interference in mounting the wiper blade 71, but in the structure of the present invention, the diameter of the mounting hole 11 is not increased, so that the aforementioned problem may be solved.

As illustrated in FIG. 4, the lead wire 41 is connected to the camera module 40 in a state of being fitted into the grommet 50, so that it is possible to prevent water from flowing along the lead wire 41, and the rib 82 is formed in the watertight pad 80, the stepped portion 52 is formed at the end 51 at one side of the grommet 50, and one or more protrusions 54 are formed along a circumference of the internal peripheral surface of the internal hole 53, through which the wiper pivot 70 passes, so that it is possible to more efficiently block water from entering.

The present invention additionally provides other exemplary embodiments, in which the camera housing 30 is fastened in other methods. First, referring to FIG. 5, in the present exemplary embodiment, a wiper pivot 70 itself is formed with a screw thread, instead of the bolt part 21 formed in the base plate 20, and the screw thread is formed at a portion of the wiper pivot 70 protruding to an external side of the camera housing 30, and a fastening nut 60a is coupled to the protruding portion, so that the camera housing 30 is fixed.

Figure 5:
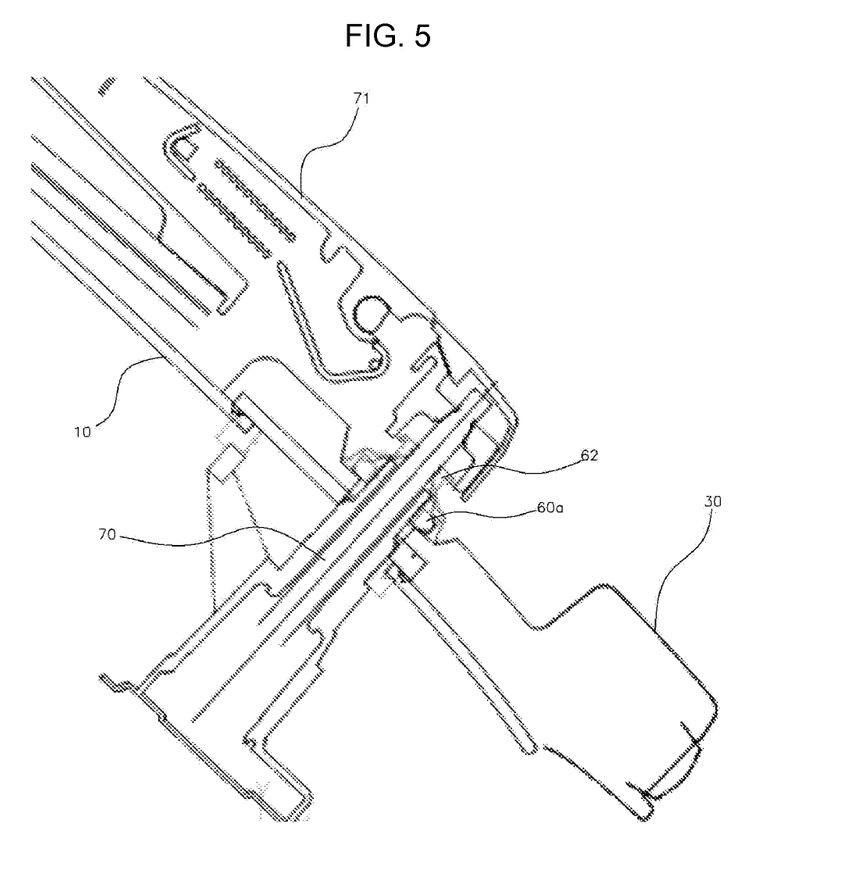
FIG. 5, FIG. 6 and FIG. 7 are views illustrating a state where a rear camera is mounted according to other exemplary embodiments of the present invention.

In the structure, the fastening nut 60a has a structure protruding to the outside, so that in order to secure water tightness, a cap 62 is additionally coupled to the wiper pivot 70 so as to cover the fastening nut 60a from an external side.

Figure 6:
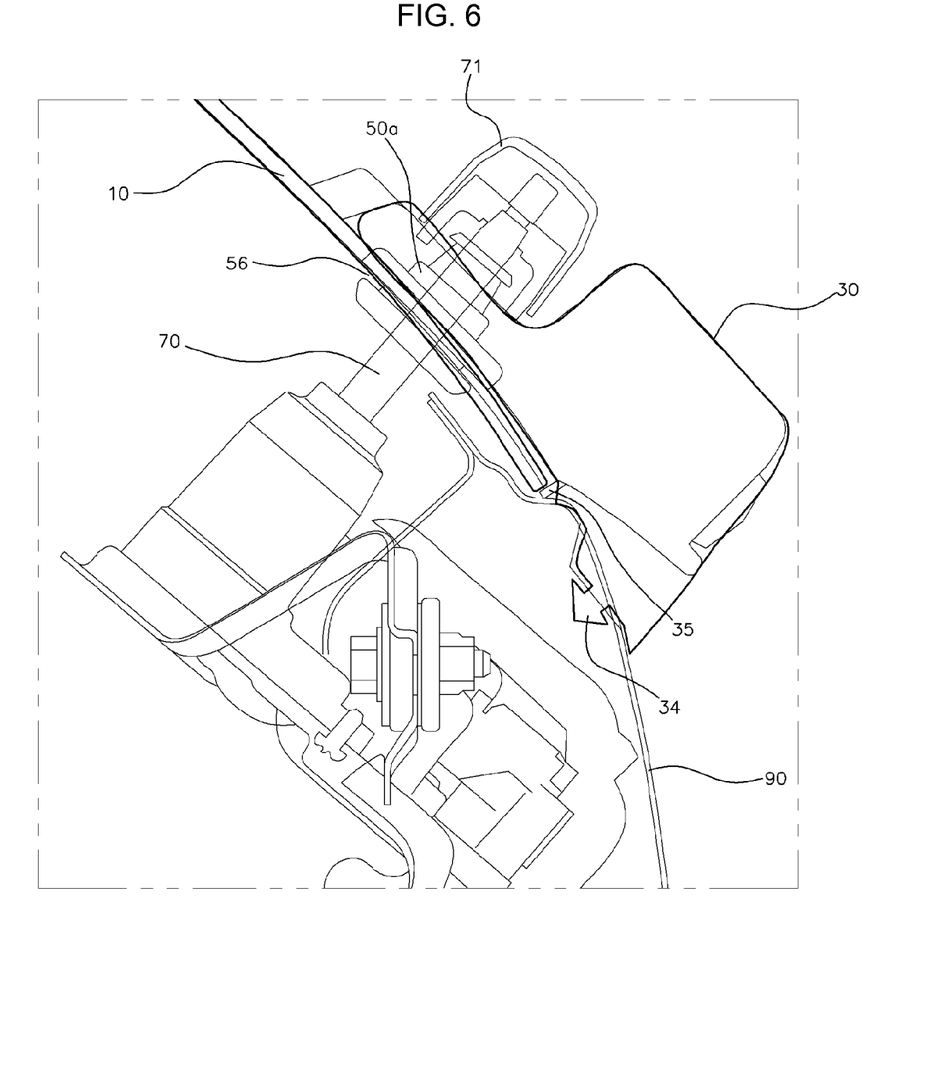
Figure 7:
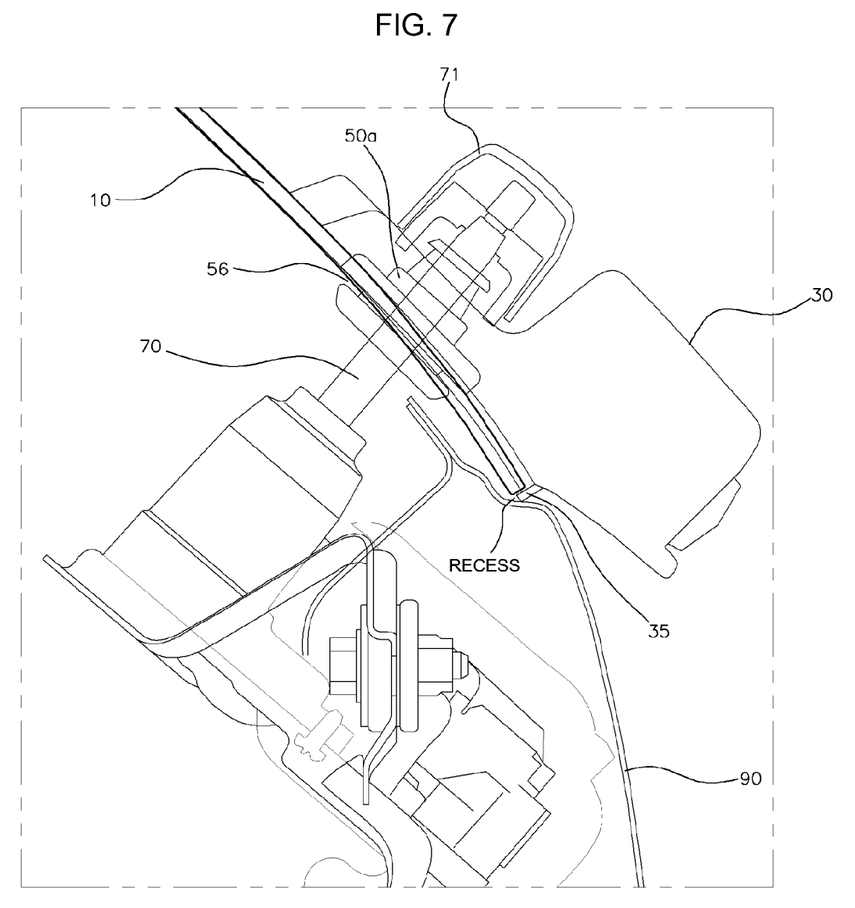

As illustrated in FIGS. 6 and 7, in another exemplary embodiment of the present invention, a fixing recess 56 is formed in a grommet 50a along a circumference of an external peripheral surface of the grommet 50a, and the fixing recess 56 is fitted into a border of a mounting hole 11, so that the grommet 50a may be fixed. In the present exemplary embodiment, the base plate 20 and the fastening nuts 60 and 60a may be omitted, and the grommet 50a itself has a structure which is in close contact with the rear glass 10, so that a watertight pad 80 may also be selectively omitted.

In the exemplary embodiment, the grommet 50a is formed with a stepped portion 52 (covering a part of a surrounding portion of a coupling hole of a camera housing) at a portion of the grommet 50a protruding to the external side of a camera housing 30, so that the camera housing 30 may be fixed by the grommet 50a.

However, the aforementioned structure has decreased coupling power as compared to a fixed structure through the fastening nuts 60 and 60a, so that in order to improve fixing power of the camera housing 30, an additional coupling structure may be selectively provided.

That is, as illustrated in FIG. 6, a mounting clip 34, which may be restricted by an external surface of a vehicle body panel 90 coupled with a rear glass 10, may be separately provided at a lower end of one surface of the camera housing facing the rear glass. The mounting clip 34 may be installed so as to be restricted while being fitted into a hole separately perforated in the external surface of the vehicle body panel 90.

As illustrated in FIG. 7, a restrictive protrusion 35, which enters a recess formed between the vehicle body panel 90 coupled with the rear glass 10 and the rear glass 10, so that a movement thereof is restricted, may be formed on one surface of the camera housing 30 facing the rear glass 10 without necessity of perforating a separate hole in the vehicle body panel 90, instead of the structure of FIG. 7.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for mounting a rear camera for a vehicle, the structure comprising:
    a rear glass, in which a mounting hole is perforated;
    a camera housing, in which a camera module is embedded; and
    a wiper pivot which is configured to enter the mounting hole from an internal side of the rear glass, and has an end of an external side coupled with a wiper blade,
    wherein the camera housing is mounted so that the wiper pivot passes through the camera housing, and is fixed between the wiper blade and the rear glass, in a manner that the camera housing is coupled so that the wiper pivot passes through an upper portion of the camera housing, and the camera module is located at a lower portion of the camera housing.

2. The structure of claim 1, wherein a lead wire connected with the camera module is arranged to pass through the mounting hole.

3. The structure of claim 2, wherein a grommet made of an elastic material, is coupled with the wiper pivot to secure water tightness at a point, through which the wiper pivot passes.

4. The structure of claim 3, wherein the grommet is mounted so that an end of the grommet protrudes while passing through a coupling hole formed in the camera housing, through which the wiper pivot passes, and a stepped portion, which is formed to have a larger external diameter than an internal diameter of the coupling hole and covers a part of a surrounding portion of the coupling hole, along a circumference of the coupling hole is formed in the grommet.

5. The structure of claim 4, wherein the grommet is formed with at least one protrusion formed on an internal peripheral surface of an internal hole, through which the wiper pivot passes, along a circumference of the internal hole.

6. The structure of claim 1, further comprising:
    a base plate located to be in contact with an external surface of the rear glass at a perforation position of the mounting hole, and coupled with the camera housing,
    wherein the base plate includes a bolt portion protruding into an internal side of the rear glass, and a fastening nut is screw-engaged with the bolt portion at the internal side of the rear glass, so that the base plate is fixed.

7. The structure of claim 6, wherein a watertight pad made of an elastic material is mounted between the rear glass and the base plate.

8. The structure of claim 7, wherein a fitting hole, into which the bolt portion is fitted, is formed in the watertight pad, and a rib, which is elastically pressed when the base plate is seated, protrudes along a circumference of the fitting hole.

9. The structure of claim 6, wherein concave-convex portions, which is engaged with each other, are formed in the base plate and the camera housing, respectively, so that the base plate and the camera housing are coupled by the engagement of the concave-convex portions.

10. The structure of claim 6, wherein a double-sided tape is bonded onto a surface of the base plate, which is in contact with the rear glass.

11. The structure of claim 2, wherein a screw thread is formed on an external peripheral surface of the wiper pivot at a portion protruding to an external side of the camera housing, and the screw thread is screw-engaged with a fastening nut, so that the camera housing is fixed.

12. The structure of claim 11, further comprising a cap coupled with the wiper pivot to cover the fastening nut at an external side of the fastening nut.

13. The structure of claim 3, wherein a fixing recess is formed in an external peripheral surface of the grommet along a circumference of the external peripheral surface, and the fixing recess is fitted into a border of the mounting hole, so that the grommet is fixed.

14. The structure of claim 3, wherein a mounting clip, which is restrictive by an external surface of a vehicle body panel coupled with the rear glass, is provided on a surface of the camera housing facing the rear glass.

15. The structure of claim 3, wherein a restrictive protrusion, which enters a recess formed between a vehicle body panel coupled with the rear glass and the rear glass, so that a movement of the restrictive protrusion is restricted, is formed on a surface of the camera housing facing the rear glass.

* * * * *